Patented Dec. 1, 1953

2,661,339

UNITED STATES PATENT OFFICE 2,661,339

BLENDS OF RESINOUS STYRENE-CONJUGATED DIENE COPOLYMERS AND RUBBERY MATERIALS

William J. Sparks, Anthony H. Gleason, and Per K. Frolich, Westfield, N. J., assignors, by mesne assignments, to Jasco, Incorporated, a corporation of Delaware No Drawing. Application March 2, 1946,
Serial No. 651,608

11 Claims. (Cl. 260—5)

This invention relates to polymer compositions and particularly to compositions comprising relatively soft rubber or rubber-like materials with compounding ingredients imparting stiffness or hardness to the composition.

Natural rubber and the polymerizates obtained by the polymerization of conjugated diolefins or mixtures of a major proportion of a conjugated diolefin with a minor proportion of an unsaturated comonomer in aqueous emulsion are soft, pliable and plastic materials having a very low elastic modulus. These properties are essential for many uses such as in the manufacture of automobile tires and inner tubes. There are many other uses wherein other properties of rubber or rubbery polymers such as chemical or electrical resistance are of controlling importance while the aforesaid physical properties or rubber-like behavior are of little or no importance if not definitely detrimental to the usefulness of the material. For example in gaskets, shoe sole stocks, top lifts, molded insulators and tubing, pliability, low elastic modulus and the like are not particularly desirable and as a matter of fact the rubbery materials must be modified through compounding in order to render the compositions capable of retaining their shape or form as when molded.

Several materials have been suggested as compounding ingredients for rubber or rubbery organic polymers in order to impart stiffness or hardness or to increase the elastic modulus of these rubbery materials. Materials suggested for this purpose have included shellac, cyclized rubber and also certain rubber derivatives obtained by treating rubber with certain acids such as phenol sulfonic acids or with certain hydrochlorides of tin. These materials have not proven to be very satisfactory either because they are imported materials or because the chemicals entering into their manufacture are difficult to obtain or because the compounding ingredients have been found to have a detrimental effect upon the properties of the rubber or polymer compounds or the vulcanizates obtained therefrom.

It is the object of this invention to modify the physical properties of soft, rubbery, vulcanizable materials in order to increase their stiffness and hardness and also to increase their resistance to tear.

It is also the object of this invention to increase the elastic modulus and improve the extrudability of soft, rubbery, vulcanizable materials without injuring their electrical properties.

It is a further object of this invention to prepare novel compositions of matter comprising soft rubbery vulcanizable materials and compounding ingredients which possess improved physical characteristics, greater stability and greater ease of working.

These and other objects will appear more clearly from the detailed description and claims which follow.

According to the present invention, modified vinyl aromatic compound polymers, which retain to a major degree the hardness and thermoplasticity of polystyrene and the like and yet exhibit compatibility with certain soft rubbery, vulcanizable materials are blended or compounded in any proportion, depending upon the hardness, elasticity and modulus desired, with rubbery materials such as natural rubber, emulsion polymerizates of conjugated diolefins and emulsion copolymerizates of a major proportion of a conjugated diolefin with a minor proportion of a vinyl aromatic compound. The modified vinyl aromatic polymers, which are hard, brittle, resinous materials are preferably preheated so that they will not shatter and fly about as they would if passed cold through the mill rolls. The preheated or softened resin is then placed on the mill or in a suitable mixing device and slightly masticated, soft, rubbery material is added to it. The rubbery material should be added slowly at first and the batch cut frequently until sufficient rubber to exert a plasticizing effect has been added whereupon the remainder of the rubbery material may be added more rapidly. When the modified vinyl aromatic polymer and the rubbery material are thoroughly blended, the composition may be formed into appropriate shapes, either by extrusion or by molding. Blending of the resinous and rubbery materials may also be effected by dissolving the respective materials in suitable solvents for the resinous and rubbery materials and then driving off the solvents. A particularly advantageous method of blending the resinous and rubbery materials is by blending the aqueous latices of the respective materials in the desired proportion, coagulating the mixture, separating, washing and drying the blend. In this way the difficulties encountered in coagulating the resinous polymer latices and drying the thermoplastic resinous product are avoided and good, homogeneous blends of the two products are easily obtained.

The modified vinyl aromatic polymers used in accordance with the present invention are hard, tough, thermoplastic resinous interpolymers having a molecular weight above about 400,000 which are obtained by polymerizing in aqueous emulsion a mixture of 65 to 95 weight percent of a vinyl aromatic compound such as a certain polyhalogenated styrenes and compounds corresponding to the general formula:

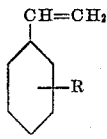

wherein R stands for a member of the group consisting of hydrogen, methyl, ethyl propyl, methoxy, ethoxy, chlorine, bromine, fluorine and cyano, and 35 to 5% by weight of a conjugated diolefin containing from 4 to 12, preferably from 4 to 6, carbon atoms per molecule. Vinyl aromatic compounds which may be used in accordance with this invention include styrene, para methyl-, ethyl- or propyl styrenes, mono- and polychlorinated, brominated or fluorinated styrenes, methoxy- or ethoxy styrenes and cyanostyrene. Diolefins which may be used in the preparation of such copolymers include butadiene, isoprene, piperylene, dimethyl butadiene, and methyl pentadiene. Instead of a diolefin, chloroprene and the like may be used also. The preparation of these resins is described in detail in our application Serial No. 408,814 filed August 29, 1941 and in a continuation-in-part of said application bearing Serial No. 638,515, filed December 29, 1945, now Patent No. 2,526,654.

Essentially these copolymers are prepared by dispersing one part of the monomer mixture in from an equal to a fourfold quantity of water using a suitable emulsifier of the soap type such as sodium oleate, stearate, palmitate, or the like or other surface active material such as salts of alkylated naphthalene sulfonic acids, aliphatic or olefinic sulfonic acids and the like. A polymerization catalyst such as benzoyl peroxide, hydrogen peroxide, alkali metal or ammonium persulfates or perborates and polymerization modifiers such as carbon disulfides, aliphatic mercaptans such as heptyl, octyl, dodecyl, lauryl (usually prepared from commercial lauryl alcohol) or octadecyl mercaptan are added to the reaction mixture and the latter is maintained under elevated pressure at temperatures from about 35° C. to about 75° C. until the desired conversion is reached. If the latex thus formed contains unreacted monomers it is then stripped of unreacted materials and coagulated, preferably by adding the latex to a solution of a suitable coagulant. The interpolymer is then recovered, washed and dried, preferably upon a hot mill (170–180° F.), whereupon it is in condition for use in admixture with soft vulcanizable rubbery material in accordance with the present invention. The reaction is ordinarily carried to at least 80–90% monomer conversion in order to obtain products of the desired molecular weight, i. e., 400,000 or more calculated from the intrinsic viscosity of the polymers. The most desirable resins for our purposes are obtained by a combination of high styrene to diene ratios, high conversions with consequent high molecular weight and hot mastication of the copolymer product.

While the copolymer as ordinarily prepared possesses a molecular weight, as determined from its intrinsic viscosity, above about 400,000, it is possible and under some circumstances it is advantageous to break down or partially depolymerize the copolymer in order to enhance its compatibility with the vulcanizable rubbery materials with which it is to be compounded. This depolymerization may be readily effected on milling rollers, in a kneader or other suitable attritioning equipment.

The soft, vulcanizable rubbery material, which may be used in accordance with the present invention includes natural rubber and the soft, synthetic rubber-like materials obtained by polymerizing conjugated diolefin hydrocarbons of from 4 to 6 carbon atoms per molecule or mixtures of a major proportion of a conjugated diolefin hydrocarbon of from 4 to 6 carbon atoms per molecule and a minor proportion of a vinyl aromatic compound or a styrene in aqueous emulsion. The conjugated diolefins that may be used for the preparation of synthetic rubber-like materials used in accordance with the present invention are butadiene, isoprene, piperylene, dimethyl butadiene, methyl pentadiene and the like. The vinyl aromatic compounds or styrenes that may be used in the preparation of the synthetic rubber-like copolymerizates are styrene, alpha methyl styrene, para methyl styrene, alpha methyl para methyl styrene, dichlorostyrene and the like. The soft synthetic rubber-like product obtained by polymerizing butadiene and styrene in a ratio of 3 to 1, dispersed in about a twofold quantity of water by means of a suitable emulsifying agent and utilizing a suitable oxygen-liberating polymerization catalyst such as potassium persulfate and a suitable polymerization modifier such as dodecyl mercaptan and commonly known as Buna-S is the preferred synthetic rubber-like material for use in the present invention.

The amount of resin blended with the rubber or rubber-like material may be varied depending upon the composition of each and upon the properties desired in the final product. If it is desired to have the mixture remain rubber-like, use of not more than equal parts of resin and rubber is advisable. Use of amounts of resin in excess of the rubbery material results essentially in rubber modified resin compositions while the use of amounts of rubber in excess of the resin results essentially in resin modified rubber compositions. In general it has been found that the greatest improvement in the extrudability of the rubbery materials is obtained with resins having marginal compatibility with the particular rubber.

The following examples are illustrative of the present invention.

EXAMPLE 1

550 grams of styrene and 318 cc. of a $C_5$ hydrocarbon fraction containing 80% isoprene, which is equivalent to 25% of isoprene in the charge, together with 125 cc. of a 2.8% solution of potassium persulfate in water and 25 cc. of carbon bisulfide were dispersed in 1250 cc. of a 2.5% solution of sodium oleate in water and the mixture was polymerized in a pressure vessel for 20 hours at 55° C. The resulting latex-like dispersion was coagulated by adding saturated brine and isopropyl alcohol. The coagulate, after washing three times with water and once with alcohol in a kneader, was dried by milling on a warm mill. The resinous copolymer thus obtained was completely soluble in benzene and had a molecular weight greater than 400,000 as calculated from its intrinsic viscosity.

The modified polystyrene resin or resinous copolymer prepared in the foregoing manner was blended with natural rubber according to the following recipe.

| | Parts |
|---|---|
| Smoked sheet and modified polystyrene resin (in the proportions indicated below) | 100 |
| Sulfur | 3 |
| Mercaptobenzothiazole | 1 |
| Zinc oxide | 5 |
| Semi-reinforcing black | 18 |
| Phenyl-beta-naphthylamine | 1.5 |
| Stearic acid | 1 |

Seven stocks were mixed, cured and tested. Starting with the control, which contained 100 parts of rubber, the rubber was decreased by ten parts and the resin increased by the same amount in each succeeding compound until the last in the series contained 40 parts of rubber and 60 parts of resin. Sulfur and accelerator were kept constant throughout, being based on the total hydrocarbons rather than on the rubber alone.

A range of cures at 292° F. was obtained on the tensile sheets running in ten minute intervals from ten to forty minutes. In the case of the all rubber stock, the ten minute cure was either at or near the optimum as it had the highest tensile and succeeding cures dropped off in tensile strength in slight but noticeable decrements. The resin appeared to retard the cure very little, if at all. This is a factor of considerable importance since other hardening agents such as shellac and cyclized rubber are saturated or substantially saturated materials and have a pronounced tendency to retard the curing of rubber compounded therewith.

The several compounds were tested for tensile strength as found and after aging for 96 hours in an oxygen bomb and after aging for 14 days in a Geer oven, for elongation, modulus, hardness and tear resistance. The results obtained from the several tests are summarized in Table I.

distinguishing differences in stocks above the one containing 40 parts of resin. Although the hardness of the higher resin mixtures could not be satisfactorily measured with the "A" Durometer they were definitely harder by hand.

EXAMPLE 2

Several copolymers of styrene with butadiene and with isoprene were prepared according to the following recipe:

| | |
|---|---|
| Styrene | 65–95 parts |
| Diolefin (butadiene or isoprene | 33–5 parts |
| Lauryl mercaptan | 0.05 part at start |
| Lauryl mercaptan | 0.05 part at 75% conv. |
| Water | 300 parts |
| Sodium soap of selectively hydrogenated tallow acids (complete neutralization) | 7 parts |
| Potassium persulfate | 0.45 part |
| Temperature | 50° C. at start |
| Raised after 50% conversion to | 55° C. |
| Raised after 75% conversion to | 60° C. |
| Conversion | 95±% |
| Time | 14–16 hours |

Four samples using each diolefin were prepared using feed ratios of 65, 75, 85 and 95% styrene with 35, 25, 15 and 5% respectively of the diolefin in the feed.

Upon completion of the runs, the reaction mixture was short stopped with ditertiary butyl cresol, and coagulated by adding the stripped latex to a solution of a suitable coagulant such as sodium chloride brine. The coagulate was recovered by filtration, and then washed and dried on a mill. The copolymers obtained were nearly water-white Table I

| Sample | Tensile lbs./sq. in. (10 Min. Cure) | Tensile lbs./sq. in. After Aging | | Percent Elongation at Break | Modulus lbs./sq. in. at 300% Elong. | Hardness Type A Durometer | Tear Resistance lbs./sq. in. 20 Min. Cure |
|---|---|---|---|---|---|---|---|
| | | 96 Hours in O₂ Bomb | 14 Days in Geer Oven | | | | |
| Control (All Rubber) | 3,725 | 3,060 | 3,480 | 725 | 450 | 45 | 105 |
| 90% Rubber, 10% Resin | 3,300 | 2,875 | 3,290 | 675 | 850 | 55 | 140 |
| 80% Rubber, 20% Resin | 3,200 | 2,730 | 2,650 | 625 | 950 | 68 | 205 |
| 70% Rubber, 30% Resin | 2,300 | 2,060 | 1,870 | 550 | 1,075 | 85 | 235 |
| 60% Rubber, 40% Resin | 1,850 | 1,475 | 1,830 | 525 | 1,350 | 100 | 330 |
| 50% Rubber, 50% Resin | 1,400 | 1,200 | 1,290 | 100 | | 100 | 505 |
| 40% Rubber, 60% Resin | 2,000 | 1,950 | | 25 | | 100 | |

It may readily be seen from the foregoing data that the resin added produced a substantial increase in the elastic modulus, hardness and tear resistance of the rubber: and that the percent elongation is still over 500% in composition containing 40% of resin. The tensile strengths of the bomb aged and oven aged samples show that the resin has no deleterious effect upon the aging characteristics of the rubber compound. The hardness of the several compounds was determined by means of a Type A Shore Durometer and this instrument was found to be incapable of or yellowish transparent resins, all of which were completely soluble in benzene.

Blends of each of these copolymers with natural rubber and with Buna-S (an emulsion copolymer of 3 parts of butadiene with 1 part of styrene) were prepared by softening the resin by heating in an oven to 200° F. placed on a mill and the rubber blended in using a 25/75 ratio of resinous copolymer to rubber. The several blends were extruded in a No. 1/2 Royal extruder having a head die with 0.4" outside diameter and 0.3" inside diameter. The temperature of the head was 220° F. The results obtained are summarized in the following table:

Table II

A—BLENDS OF RESINOUS COPOLYMERS WITH NATURAL RUBBER IN THE RATIO OF 25/75

| Resinous Copolymer | Extrusion Rate, grams/min. | Appearance |
|---|---|---|
| Styrene-Butadiene: | | |
| 65-35 | 116 | Very rough (a little rougher than plain rubber). |
| 75-25 | 142 | Intermediate. |
| 85-15 | 121 | Smooth. |
| 95-5 | 99 | Intermediate. |
| Styrene-Isoprene: | | |
| 65-35 | 79 | Very rough (rougher than plain rubber). |
| 75-25 | 104.5 | Very rough (a little rougher than plain rubber). |
| 85-15 | 119 | Intermediate (a little smoother than plain rubber). |
| 95-5 | 99 | Smooth. |

B—BLENDS OF RESINOUS COPOLYMERS WITH BUNA-S IN THE RATIO OF 25/75

| Resinous Copolymer | Extrusion Rate, grams/min. | Appearance |
|---|---|---|
| Styrene-Butadiene: | | |
| 65-35 | 124.5 | Very rough (but smoother than plain GR-S). |
| 75-25 | 116 | Do. |
| 85-15 | 119 | Do. |
| 95-5 | 144 | Intermediate. |
| Styrene-Isoprene: | | |
| 65-35 | 112 | Very rough (but smoother than plain GR-S). |
| 75-25 | 108.5 | Do. |
| 85-15 | 129.5 | Very rough (Smoothest of 4 blends). |
| 95-5 | 106.5 | Very rough (but smoother than plain GR-S). |
| Plain Natural Rubber | 52 | Rough. |
| Plain Buna S | 105.5 | Extremely rough. |

In the case of the blends of the resins with natural rubber it may be observed that the mixtures with the 65% styrene-35% diene resins were poorer than the natural rubber alone. These mixtures were completely compatible. The 75/25 and the 85/15 resins were soluble but not completely compatible and gave the best results. The 95/5 resin was so incompatible that the mixture with natural rubber behaved poorly.

EXAMPLE 3

Some of the resins prepared as in Example 2 were softened and blended with Buna S in the ratio of 50 parts of resin to 50 parts of Buna S and the extrusion processability determined as in Example 2, i. e., in a Royle extruder 0.4" O. D. and 0.3" I. D. head with extrusion head temperature of 220° F. The results obtained are summarized in Table III.

Table III

EXTRUSION PROCESSABILITY IN 50-50 MILL MIX OF RESIN AND BUNA S

| Resin Composition | Styrene 75, Isoprene 25 | Styrene 85, Isoprene 15 | Styrene 75, Butadiene 25 | Styrene 85, Butadiene 15 |
|---|---|---|---|---|
| Extrusion Rate: | | | | |
| Inches/minute | 50 | 30 | 30 | 38. |
| Grams/minute | 105 | 84 | 58 | 80. |
| Appearance of Extruded Tube. | Smooth | Rough | Very Rough | Rough. |

The above data appears to indicate that in the case of high resin content mixtures, a more compatible resin is necessary in order to get maximum processability. In the case of 50-50 blends the extruded tubes with the isoprene-styrene resins are much stiffer than those containing the butadiene-styrene resin. This is the opposite from what one might except since the resins prepared with butadiene as the diolefinic components are in general harder resins than those made with isoprene. The reasons why the blends containing the butadiene-styrene resins are more pliable is apparently due to quite incomplete solubility of the resin in the rubber.

The modified vinyl aromatic compound polymers prepared in accordance with the above examples are not only applicable to blending with natural rubber and synthetic rubber-like material prepared by emulsion polymerization but are also applicable for blending with polyisobutylene and solid, rubber-like copolymers of isoolefins and diolefins, with oils, polyethylene, polypropylene and the like. Substances having a further plasticizing action on either of the component materials may likewise be added if desired and the usual organic and inorganic fillers or mixtures thereof may be incorporated in the composition.

The present invention, therefore, provides a method for increasing the hardness, elastic modulus and tear resistance and improving the extruding properties of natural rubber as well as synthetic rubber-like materials prepared by the polymerization of diolefins or mixtures of a major proportion of a diolefin and a minor proportion of a vinyl aromatic compound in aqueous emulsion by incorporating therein varying amounts, preferably from about 10 to about 50 parts of the hard, resinous, modified vinyl aromatic compound type copolymer described above. The mixtures of soft, vulcanizable rubbery material and hard resinous material are useful for the production of gaskets, soling stocks, top lifts and structural articles of all kinds such as extruded tubing, solid rods, wire insulation and pressed or molded articles and for the preparation of polymer coated fabrics of good light resistance and reduced tackiness.

The modified vinyl aromatic compound copolymer-vulcanizable rubbery material compositions of the present invention are particularly valuable in the construction of ultra high frequency radio transmitting and receiving systems and for insulating purposes because of the very low dielectric losses occurring in them. This very low hysteresis losses of the compositions of the present invention permit their use as insulating materials at very high frequencies i. e., ranging from 1 megacycle up, especially at frequencies above 10 megacycles, with a minimum of energy loss and maximum transfer of energy through the insulated circuits and with a minimum of heat deterioration in the insulation itself even where associated with circuits carrying relatively large amounts of high frequency energy at high voltages. The compositions are also of value in electrical insulators requiring high resistance to ozone.

The modified vinyl aromatic compound copolymers are useful in combination with practically any of the natural and synthetic resins and gums with some of which they form true solutions and with others they form a disperse phase within a continuous phase. They are particularly useful with such materials as the polyindene-coumarone resins, the polyvinyl chlorides, polyvinyl acetylene, polycoumarones, polyvinyl acetate, polyacrylates, and methacrylates, cellulose esters and ethers, chlorinated rubber, chlorinated resins, the natural and synthetic waxes, rosin and natural resins, polyamides, factice, alkyd resins, phenol formaldehyde condensation products, resins obtained from petroleum residues, hydrorubber mineral and vegetable waxes.

The interpolymers alone or in combination with soft, vulcanizable rubbers can be readily compounded with a wide range of filler materials to give new and technically useful compositions. The following list shows representative compounding substances:

Chlorinated paraffin wax
Chlorinated olefin polymers
Alkyd resins
Oxidized polymeric materials
Chlorinated resins
Carbon black, active reinforcing or inactive
Ethyl abietate
Polyesters
Polycyclopentadiene resins
Polymerized terpenes
Polymerized ethylene
Polyvinyl acetal resins
Clays
Tricresyl phosphate
Asbestos
Dibutyl phthalate
Wood flour
Cetyl methacrylate polymer
Asphalt
Pitch
Polyhydronaphthalenes
Drying oil resins
Mineral rubbers
Hydrogenated terpene polymers Thus the invention provides a new and useful composition of matter comprising an interpolymer of a major proportion of a vinyl aromatic compound such as styrene which tends to yield a hard, brittle, resinous polymer with a diolefinic modifier such as butadiene, isoprene or the like compounded with a soft, vulcanizable rubbery material such as natural rubber and emulsion polymerizates of conjugated diolefins or of mixtures of a major proportion of a conjugated diolefin and a minor proportion of a vinyl aromatic compound to yield tough, non-brittle, flexible but relatively inelastic compositions which are capable of thermoplastic molding and which possess good electrical and physical properties. The compositions are also of value in the construction of gaskets, protective films, etc. or they may be emulsified to form coating compositions for coating paper, textile fabrics and the like to impart waterproofing and electrical insulating properties.

While there are above disclosed but a limited number of embodiments of the invention, it is possible to produce still other embodiments without departing from the inventive concept herein disclosed and defined in the following claims. This application is a continuation-in-part of our application Serial No. 408,716 filed August 29, 1941.

What we claim and desire to secure by Letters Patent is:

1. A composition of matter comprising a hard, homogeneous, thermoplastic, extrudable mixture of a soft, vulcanizable rubbery copolymer of 3 parts of butadiene with 1 part of styrene; and a hard, benzene soluble, thermoplastic resin obtained by polymerizing a mixture of 75 weight percent of styrene and 25 weight percent of isoprene in aqueous emulsion at temperatures from 35° C. to 75° C. in the presence of a modifier consisting of carbon bisulfide; the ratio of thermoplastic resin to rubbery copolymer in the mixture being 1:1.

2. The composition as defined in claim 3 wherein the rubbery material is a copolymer of 3 parts of butadiene and 1 part of styrene; the thermoplastic resin is a copolymer of 85 parts of styrene and 15 parts of butadiene; and the ratio of thermoplastic resin to rubbery material is between 1 to 1 and 1 to 3.

3. A composition of matter comprising 75 to 50 parts of a soft, vulcanizable, rubbery material selected from the group consisting of natural rubber and rubbery emulsion copolymers of butadiene and styrene; in homogeneous admixture with 25 to 50 parts of a hard, non-brittle, tough, thermoplastic resin compatible therewith, obtained by copolymerizing to at least 80% conversion a mixture of 75 to 95 weight percent of styrene and 25 to 5 weight percent of a conjugated diolefin of 4 to 6 carbon atoms per molecule in aqueous emulsion at a temperature between 35 to 75° C. and in the presence of a modifier consisting of carbon bisulfide; the composition of matter being hard, thermoplastic and readily extrudable.

4. A composition of matter according to claim 3 wherein the diolefin of the hard, thermoplastic resin is butadiene.

5. A composition of matter according to claim 3 wherein the diolefin of the hard, thermoplastic resin is isoprene.

6. A composition of matter according to claim 3 wherein the diolefin of the hard, thermoplastic resin is dimethyl butadiene.

7. A composition of matter according to claim 4 wherein the rubbery material is natural rubber.

8. A composition of matter according to claim 5 wherein the rubbery material is natural rubber.

9. A composition according to claim 3 wherein the rubbery material is an emulsion copolymer of a major proportion of butadiene and a minor proportion of styrene; and the ratio of rubbery material to resin is about 50/50.

10. A composition of matter according to claim 4 wherein the rubbery material is an emulsion copolymer of 3 parts of butadiene and 1 part of styrene.

11. A composition of matter comprising a homogeneous mixture of 95–5 parts of a soft vulcanizable predominantly hydrocarbon rubber-like linear polymer selected from the group consisting of natural rubber and rubbery emulsion copolymers of butadiene and styrene, in homogeneous admixture with 5–95 parts of a hard, non-brittle, tough, thermoplastic resin compatible therewith, obtained by copolymerizing a mixture of 65–95 weight per cent of a vinyl aromatic hydrocarbon selected from the group consisting of styrene, paramethylstyrene, alphamethylstyrene, and paramethylalphamethylstyrene, and 35–5 weight per cent of a conjugated diolefin of 4 to 6 carbon atoms per molecule, in aqueous emulsion at a temperature between 35 and 75° C., in the presence of a modifier consisting of carbon bisulfide, the composition of matter being hard, tough, homogeneous, non-brittle, flexible, relatively inelastic, thermoplastic and readily extrudable.

WILLIAM J. SPARKS.
ANTHONY H. GLEASON.
PER K. FROLICH.

References Cited in the file of this patent

UNITED STATES PATENTS

| Number | Name | Date |
|---|---|---|
| 1,991,367 | Beck et al. | Feb. 19, 1935 |
| 2,335,124 | Konrad et al. | Nov. 23, 1943 |
| 2,419,202 | D'Alelio | Apr. 22, 1947 |
| 2,452,999 | Daly | Nov. 2, 1948 |

FOREIGN PATENTS

| Number | Country | Date |
|---|---|---|
| 588,785 | Germany | Nov. 27, 1933 |
| 345,939 | Great Britain | Mar. 16, 1931 |
| 456,442 | Great Britain | of 1936 |

OTHER REFERENCES

"Marbon S and S-1 Resins," pub. Dec. 28, 1944 by Marbon Corp., Gary, Indiana, 8 pages, plus title page and letter on inside front cover (total 10 pages).

Susie et al., Rubber Age, Aug. 1949, pages 537–540.

India Rubber World, January 1945, p. 422.

India Rubber World, February 1945, p. 590.

Aiken, Modern Plastics, February 1947, pp. 100–102.

Rubber Age, November 1947, p. 200.